United States Patent [19]

Blaimschein

[11] Patent Number: 4,905,551

[45] Date of Patent: Mar. 6, 1990

[54] APPARATUS FOR FIXING WORKPIECES TO BE MACHINED AND METHOD OF FIXING A WORKPIECE BY MEANS OF THAT APPARATUS

[75] Inventor: Gottfried Blaimschein, Steyr, Austria

[73] Assignee: GFM Gesellschaft fur Fertigungstechnik und Maschinenbau Gesellschaft m.b.H., Steyr, Austria

[21] Appl. No.: 190,026

[22] Filed: May 4, 1988

[30] Foreign Application Priority Data

May 18, 1987 [EP] European Pat. Off. ............ 87890103

[51] Int. Cl.⁴ .......................... B23B 33/00; B23Q 1/24
[52] U.S. Cl. ....................................... 82/1.11; 82/162; 82/164
[58] Field of Search ................ 82/9, DIG. 6, DIG. 7, 82/40 R, 40 A, 38 R, 38 A, 39, 45, 41, 1 C, 1.11, 162, 164

[56] References Cited

U.S. PATENT DOCUMENTS

| | | | |
|---|---|---|---|
| 4,254,676 | 3/1981 | Wilson | 82/1 C |
| 4,414,871 | 11/1983 | Trout | 82/40 R |
| 4,443,142 | 4/1984 | Blaimschein | 82/39 |
| 4,779,495 | 10/1988 | Berbalk | 82/9 |

FOREIGN PATENT DOCUMENTS

| | | | |
|---|---|---|---|
| 8700466 | 1/1987 | European Pat. Off. | 82/9 |
| 3031029C3 | 8/1980 | Fed. Rep. of Germany. | |
| 215487 | 11/1984 | German Democratic Rep. | 82/40 R |
| 238506 | 8/1986 | German Democratic Rep. | 82/40 R |

*Primary Examiner*—Frederick R. Schmidt
*Assistant Examiner*—Blynn Shideler
*Attorney, Agent, or Firm*—Kurt Kelman

[57] ABSTRACT

A fixing apparatus (3) for fixing a workpiece (2) to be machined comprises at least two jaws (6,7), which are individually adjustable and are preferably adapted to be fixed in position. In order to permit a workpiece (2) to be fixed exactly in a desired position, to avoid errors, to permit both centering and flat-and sag-compensating clamping sequences to be performed, and to permit various clamping sequences to be performed, at least one of the jaws (6, 7) has a position pickup (11, 12) associated with it, which detects the instantaneous position of the associated jaw (6, 7) and delivers corresponding signals to a controller (13), which in accordance with programs stored in the controller generates displacement signals which depend on the position signals and represent the distances over which the jaws (6, 7) are to be displaced and delivers said signals to actuators (8, 9) for displacing said jaws (6, 7) over said distances.

6 Claims, 1 Drawing Sheet

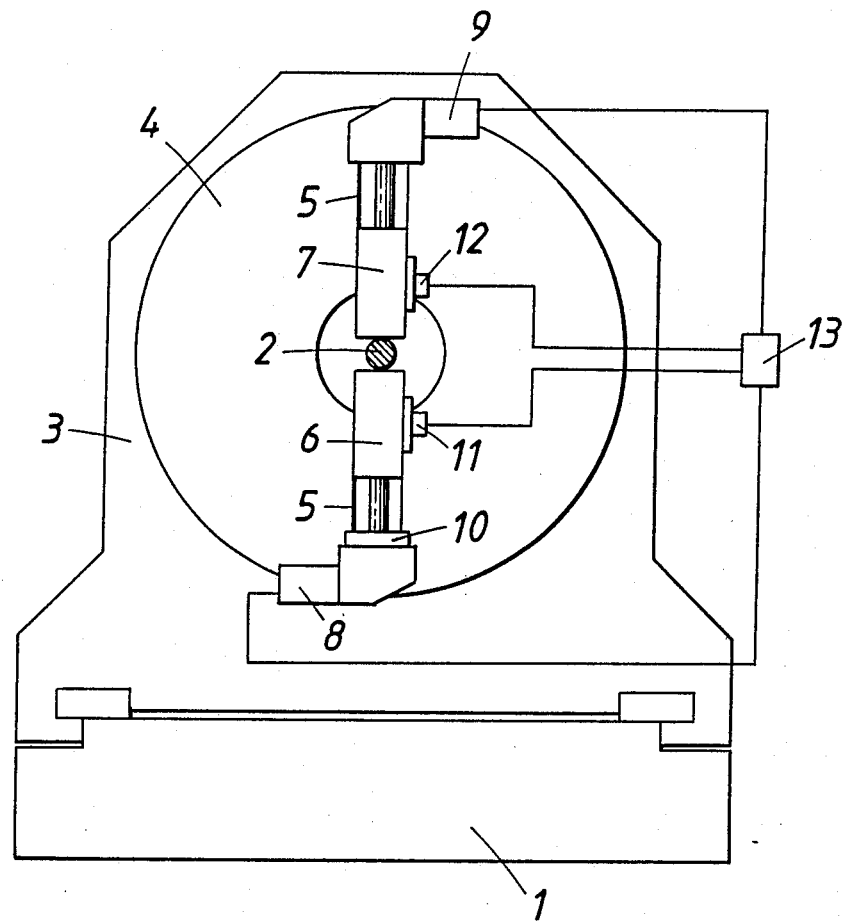

APPARATUS FOR FIXING WORKPIECES TO BE MACHINED AND METHOD OF FIXING A WORKPIECE BY MEANS OF THAT APPARATUS

BACKGROUND OF THE INVENTION

1. Field of the Invention

This invention relates to an apparatus for fixing workpieces to be machined, comprising at least two individually adjustable jaws, which are preferably adapted to be fixed in position, and to method of fixing a workpiece by means of such fixing apparatus.

2. Description of the Prior Art

Fixing apparatuses, such as back rests or rotary drives in machine tools, are known in various forms and may comprise jaws which are movable in unison so that the workpiece can be fixed in a centered position, or may comprise individually adjustable jaws so that the workpiece can be fixed by a flat- or sag-compensating clamping sequence whereas eccentricities are maintained. It has not been possible before to use one and the same fixing apparatus for fixing a workpiece in a centered position and for fixing a workpiece in a flat- or sagcompensating clamping sequence and it is not possible to monitor the fixing operation so as to detect a displacement of the workpiece under the clamping pressure, the accuracy with which the clamping jaws are adjusted, the movement of the jaws into engagement with the workpiece and the yielding movement performed under the clamping pressure. From German Patent No. 30 31 029 C3 it is known to provide one of the jaws of a back rest with an indicating device for detecting the location of the point of contact between the jaw and the workpiece and to provide also a displacement sensor for visually indicating the distance over which the jaw has been displaced. But in that case it is merely possible to move the jaw over a calculated or empirically determined distance from the indicated location of the point of contact in order to compensate a sag of the workpiece. But where a high accuracy is required, the result which can thus be achieved is not satisfactory owing to the yielding movement which is due to internal consolidation of the fixing device, the fact that the location of the point of contact is indefinite owing to local surface irregularities and the fact that the friction conditions cannot be taken into account in the adjustment of the jaws. In an endeavor to take the friction conditions and the yielding movements performed by the jaws under the clamping pressure into account it has already been proposed that in the operation by which the jaws are moved into engagement with the workpiece one of the jaws should be advanced to a predetermined extent and fixed in the resulting position and a clamping pressure should subsequently be applied to the other jaw so that the yielding movement to be expected will result in a fixation of the workpiece in the desired position. But such a so-called overstroke can be used merely to effect an approximated adaptation of the fixing apparatus but cannot be used for an exact fixation of the workpiece in the desired position. Besides, considerable non-productive times will be required for the movement of the jaws into engagement with the workpieces, particularly if the workpieces have different dimensions. the largest dimension of the workpiece must be taken into account in the design of means for slowing down the actuators from the rapid motion to the slow motion.

SUMMARY OF THE INVENTION

For this reason it is a first object of the invention to eliminate the disadvantages set forth hereinbefore and to provide a fixing apparatus which is of the kind described first hereinbefore and has a relatively simple and inexpensive structure and permits a fixation of the workpieces exactly in the desired position selectively by a flat- or sag-compensating or centering clamping sequence and ensures that various errors will be avoided during the clamping operation.

It is another object of the invention to provide desirable methods of fixing a workpiece by means of such fixing apparatus.

The first object set forth hereinbefore is accomplished in accordance with the invention by associating a position pickup means with at least one of the jaws to detect the actual position of the associated jaw and delivering position signals representing that position to a controller, adapted to control the actuators for the jaws so that the latter are displaced over distances determined by the position signals in accordance with control programs stored in the controller. Owing to the cooperations of the controller and the position pickup means, the fixing apparatus is self-controlling and, in dependence on the stored control programs, can be used not only for a centering or compensating clamping sequence but also for other operations which depend on the position of the jaws and, as a result, on the actual or desired position of the workpiece. Such sequences may effect, e.g., the elimination of errors, the determination of a sag of the workpiece, the aligning and centering of workpieces and of other fixing means, the identification of types of workpieces, and the checking of workpiece positions.

The workpiece can be clamped under a follow-up force to compensate any flat formed on the workpiece surface as the workpiece is clamped. To that end the jaws are initially moved into engagement with the workpiece and one jaw, which constitutes a backing jaw, is then fixed in position whereas the other jaw, which constitutes a pressure-applying jaw, is subjected to the clamping pressure so that the required clamping force will be maintained regardless of any flat owing to the permanent application of pressure. In accordance with the invention such a method is carried out in such a manner that the positions assumed by the backing jaw before and after the yielding movement that is performed by the clamping jaw under the clamping pressure are detected, corresponding signals are delivered to the controller and the latter controls the actuator for the backing jaw so that the latter is restored to its initial position against the clamping pressure applied by the pressure-applying jaw by a reverse movement which is equal to the position difference which has been detected. The backing jaw is released during said reverse movement and is subsequently fixed again. Because the yielding movement actually performed by the backing jaw is detected, the workpiece can be fixed by the jaws when they are exactly in the positions initially assumed and an exact flat-compensating clamping sequence can be performed regardless of conditions of internal friction and elongation.

If strong clamping forces are exerted, the detected difference between the positions of the backing jaw can be increased by the controller by a predetermined correcting value so that it will be possible to empirically compensate any flat which may occur during the machining and even a centering can be effected.

It will be particularly desirable to detect the follow-up movement performed by the pressure-applying jaw under the pressure applied at the same time as the yielding movement of the backing jaw and to deliver signals representing said follow-up-movement to the controller so that the latter can compare the two movements and in the absence of differences between said two movements or of such differences in excess of a predetermined magnitude can effect a corresponding control of the actuators, preferably with an allowance for a flattening in a magnitude which has been calculated and/or empirically determined, whereas the clamping sequence will be interrupted and repeated when such excessive difference has been detected. By such a comparison between the yielding movement and the follow-up movement it will be possible to detect the presence of small-area crusts or other surface irregularities which unilaterally yield under the clamping pressure applied so that the resulting risk of a displacement of the workpiece will be avoided. If the differences which are detected exceed those detected during the usual movements, this will suggest the presence of such crusts, which will be destroyed by the clamping pressure when it is applied for the first time. When the clamping sequence is repeated after the crusts have been eliminated, the eliminated crusts will not be able to exert undesired influences and the workpiece can be fixed exactly in the desired position. Besides, the flattening which inevitably results on the workpiece from the application of the clamping pressure can be compensated by the use of predetermined correcting values.

In a preferred embodiment of the invention, various programmed locations which are associated with predetermined positions of the jaws are stored in the controller and the control program depends on a comparison of the programmed locations and the jaw positions detected by the position pickup means. Such programmed locations may be used, e.g., for effecting a change from a rapid movement to a slow movement of the actuators at the desired time so that the non-productive times can considerably be shortened. Besides, said programmed locations can be used for a generation of signals indicating the performance of the clamping operation proper and predetermined adjusting and clamping movements may be initiated as a result of the comparison of the programmed locations and the jaw positions.

Within the scope of the invention the controller can be used for a check of the workpiece position and/or for an identification of types of workpieces by a comparison between predetermined programmed locations and actual jaw positions. This is due to the fact that the position or type of the workpiece can be detected in dependence on the extent of the movement of the clamping jaw into engagement with the workpiece and the controller can derive the desired detection from the comparison with the programmed points.

In a particularly desirable embodiment of the invention, eccentric position data representing the positions of the jaws in engagement with the workpiece when the same is in two positions, which are angularly spaced 180° apart, are delivered to the controller. In the controller, said eccentric position data are combined with centered position data representing predetermined centered positions of the workpiece to that any sag of the workpiece will be detected and the actuators are controlled to compensate such sag by a corresponding lifting of the workpiece even during the clamping sequence.

For a centering clamping sequence, suitable programmed locations may be stored in the controller. It will be more favorable, however, to mount the clamping jaws on a chunk of a stationary gripping head of the associated machine tool and to supply the controller with signals representing the jaw positions which have been detected by the position pickup means for use as reference locations in a control program for effecting a centering clamping sequence. In that case the workpiece will be held exactly in a concentric position relative to the chuck of the gripping head during the clamping sequence and will be fixed in a position in which the workpiece is actually centered on the axis of the machine tool.

Because the pressure-applying jaw can be adjusted and readjusted exactly in symmetry with respect to the axis of the machine tool, the jaws may also be used for a centering of additional fixing means and/or machining means so that the entire machine tool can be uniformly adjusted with reference to the reference points which are defined by the fixing apparatus.

BRIEF DESCRIPTION OF THE DRAWING

The single FIGURE of the drawing shows a diagrammatic end elevation of a workpiece fixing apparatus embodying the invention.

DETAILED DESCRIPTION OF THE PREFERRED EMBODIMENT

A fixing apparatus 3 for fixing a workpiece 2 that is to be machined by a machine tool is mounted on a machine bed 1 of said machine tool, which is not shown in more detail. The fixing apparatus 3 comprises a carrier 4, which has receptacles 5 for two or more clamping jaws 6, 7. The clamping jaws are individually adjustable by respective actuators, 8, 9 which may consist of suitable mechanical or hydraulic actuators. In the present embodiment, two jaws 6, 7 are provided, which are individually adjustable by the respective actuators 8, 9 toward and away from each other in a predetermined direction.

The actuators 8, 9 enable an exact adjustment of the jaws 6, 7 and the application of the required clamping pressure.

When the workpiece 2 is to be fixed in position, the two jaws 6, 7 are initially moved into engagement with the workpiece 2. One jaw 6, which constitutes a backing jaw, is then fixed in position by a clamping device 10. Thereafter the clamping pressure is applied by the actuator 9 to the other jaw 7, which constitutes a pressure-applying jaw. In this manner the workpiece 2 can be clamped in a predetermined position between the jaws 6, 7 by a constant clamping force regardless of any flat. To enable the position to be fixed exactly, to eliminate various errors which might affect the clamping action, and to adapt the apparatus to perform various clamping sequences. A position pickup 11, 12 is associated with each of the jaws 6, 7. Said position pickups detect the actual positions of the jaws and deliver corresponding position signals to a controller 13, in which control programs have been stored. In accordance with said control programs, the controller 13 controls the actuators 8, 9 for the jaws 6, 7 in dependence on the position signals delivered by the position pickups 11, 12. Owing to the cooperation of the position pickups 11, 12 and the controller 13, the clamping sequence can be monitored at any time and can be controlled as desired in accordance with the control programs. For this reason the fixing apparatus 3 has a wide field of operation and the fixing device 3 and particularly its jaws 6, 7 can be used not only to perform a compensating and centering clamping sequence for the fixation of workpieces 2 but may also be used for a compensation of yielding movements and of the effects of flats and other errors, also for a detection of a sag of the workpiece 2, for a detection of workpiece positions and an identification of types of workpieces, and even for an adjustment of additional fixing means and of machining units of the machine tool.

I claim:

1. In a fixing apparatus for use in a machine tool for machining a workpiece, which comprises
   at least two jaws for clamping the workpiece therebetween and operable to move toward and away from each other along respective displacement paths, and
   a respective actuator associated with each one of the clamping jaws and operable to move each one of said jaws individually to position the jaw along the displacement path thereof,
   the improvement comprising
   (a) position pickup means associated with at least one of the clamping jaws and operable to generate position signals corresponding to all actual positions of the associated clamping jaw along the displacement path thereof, and
   (b) a controller incorporating a stored control program, the controller having
      (1) an input receiving the position signals from the position pickup means and
      (2) an output delivering displacement signals to the actuator of the associated clamping jaw, the displacement signals being a function of the received position signals in accordance with the stored control program whereby the actuator moves the associated clamping jaw along the displacement path over a distance determined by the received position signals.

2. In the fixing apparatus of claim 1, the improvement further comprising a clamping device associated with at least one of said clamping jaw for clamping the associated clamping jaw in a desired position along the displacement path thereof.

3. In a method of fixing a workpiece in a machine tool for machining the workpiece, which comprises
   initially moving two clamping jaws operable to move toward and away from each other along respective displacement paths into engagement with the workpiece with a respective actuator associated with each one of the clamping jaws and operable to move each one of said jaws individually to position the jaw along the displacement path thereof,
   fixing one of the jaws serving as a backing jaw in an initial position wherein it engages the workpiece and
   moving the other one of the jaws serving as pressure-applying jaw along the displacement path thereof toward the backing jaw to apply clamping pressure to the engaged workpiece and causing a yielding movement of the backing jaw along the displacement path thereof,
   the improvement comprising the steps of
   (a) picking up the respective positions of the backing jaw along the displacement path thereof before and after the yielding movement and generating position signals corresponding to the respective positions,
   (b) transmitting the position signals to a controller incorporating a stored control program, and
   (c) delivering displacement signals to the actuator of the backing jaw, the displacement signals being a function of the received position signals in accordance with the stored control program whereby the actuator moves the backing jaw back to the initial position along the displacement path over a distance corresponding to the yielding movement and determined by the received position signals, the backing jaw being released during the back movement and then fixed again.

4. In the workpiece fixing method of claim 3, wherein the improvement comprises the further steps of
   (a) picking up the respective positions of the pressure-applying jaw along the displacement path thereof before and after the pressure-applying movement and generating position signals corresponding to the respective positions,
   (b) transmitting the position signals to the controller,
   (c) comparing the received position signals of the backing and pressure-applying jaws in the controller with the control program to detect any deviation outside a range determined by the control program,
   (d) delivering displacement signals to the actuator of the pressure-applying jaw to move said jaw if no deviation is detected, and to interrupt movement of the pressure-applying jaw if a deviation is detected, and then to repeat the movement.

5. In the workpiece fixing method of claim 3, wherein the improvement comprises the further step of storing location data corresponding to predetermined positions of the clamping jaws in the control program, the displacement signals depending on a comparison between the stored location data and the received position signals.

6. In the workpiece fixing method of claim 3, wherein the improvement comprises the further steps of storing in the control program respective data corresponding to eccentric engagement positions of the clamping jaws for two workpiece positions which are angularly spaced apart 180° and data corresponding to a centered position of the workpiece, comparing the eccentric engagement position data and the centered position data in the controller to indicate any sag in the workpiece, generating a sag indicating signal, and delivering the sag indicating signal to at least one of the actuators to compensate for the sag.

* * * * *